United States Patent
Haley et al.

(10) Patent No.: US 7,085,871 B2
(45) Date of Patent: Aug. 1, 2006

(54) INFORMATION HANDLING SYSTEM WHEREIN DISPLAY MOVEMENT FROM AN OPEN POSITION TO A CLOSED POSITION TRIGGERS AN UNDOCKING REQUEST

(75) Inventors: Charles L. Haley, Belton, TX (US); James E. Dailey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 242 days.

(21) Appl. No.: 10/616,063

(22) Filed: Jul. 9, 2003

(65) Prior Publication Data

US 2005/0010708 A1    Jan. 13, 2005

(51) Int. Cl.
*G06F 13/00* (2006.01)
(52) U.S. Cl. ..................................... 710/303
(58) Field of Classification Search ................. 710/303
See application file for complete search history.

(56) References Cited

U.S. PATENT DOCUMENTS

| | | | |
|---|---|---|---|
| 5,798,951 A | * | 8/1998 | Cho et al. .................. 710/303 |
| 5,889,964 A | | 3/1999 | Cho et al. |
| 6,088,620 A | | 7/2000 | Ninomiya et al. |
| 6,141,711 A | | 10/2000 | Shah et al. |
| 6,216,187 B1 | * | 4/2001 | Truong ....................... 710/304 |
| 6,243,819 B1 | * | 6/2001 | Jung ............................ 713/320 |
| 6,418,013 B1 | | 7/2002 | Broder et al. |
| 6,493,782 B1 | | 12/2002 | Verdun et al. |
| 6,516,374 B1 | * | 2/2003 | Kinoshita et al. ........... 710/304 |
| 6,760,851 B1 | * | 7/2004 | Teshima et al. ............. 713/320 |
| 6,813,145 B1 | * | 11/2004 | DeLuga ....................... 361/679 |

OTHER PUBLICATIONS

Compaq Maintenance and Service Guide-Compaq Evo N600c, Aug. 2001.

* cited by examiner

Primary Examiner—John R. Cottingham
Assistant Examiner—Christopher A. Daley
(74) Attorney, Agent, or Firm—Haynes and Boone, LLP

(57) ABSTRACT

A method and apparatus are provided for sensing when a display of a portable information handling system (IHS) is moved from an open position to a closed position. The closing of the display is employed as a trigger for the generation of an undocking request to the operating system of the IHS. Undocking the IHS from the docking device is made easier because the user does not need to locate and then push a docking request button on the docking station.

21 Claims, 3 Drawing Sheets

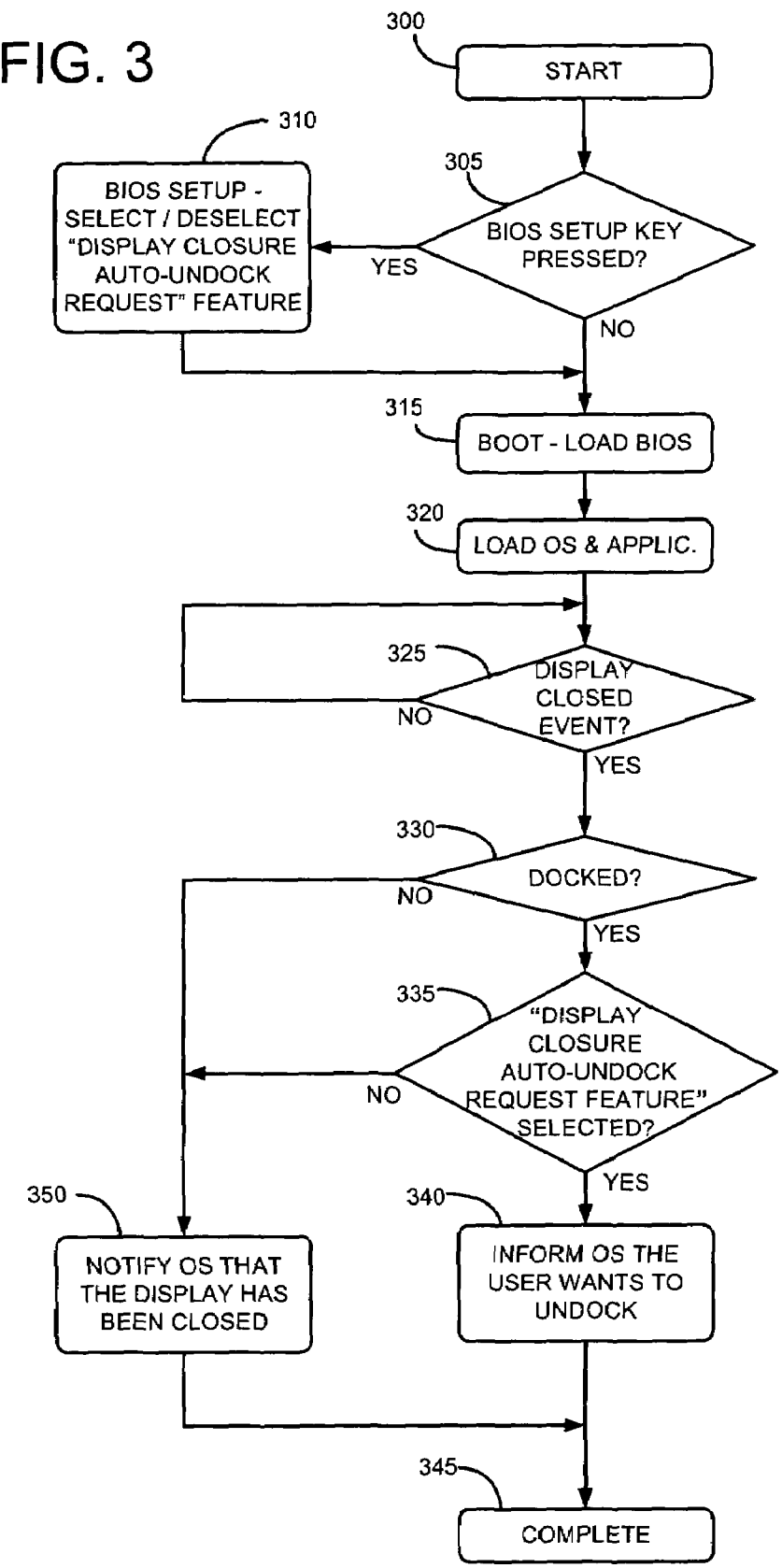

INFORMATION HANDLING SYSTEM WHEREIN DISPLAY MOVEMENT FROM AN OPEN POSITION TO A CLOSED POSITION TRIGGERS AN UNDOCKING REQUEST

BACKGROUND

The disclosures herein relate generally to information handling systems (IHS's) and more particularly to the undocking of portable information handling systems from docking devices such as docking stations and port replicators.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable IHS's such as laptop, notebook and other small computing devices are frequently moved from location to location. When a portable IHS is used at a particular location for a long period of time, the user will often dock the portable IHS to a docking device such as a docking station or port replicator to provide the IHS with enhanced functionality. The docking device typically couples the portable computer to a full size display, full size conventional keyboard and movable pointing device or mouse so that the IHS user experiences the feel of a workstation which is larger than the portable IHS.

Portable IHS's typically include a display which rotates about a base unit from an open "in use" position to a closed storage position. Many portable IHS users are in the habit of closing the display to place the IHS in a power saving suspend state before moving the IHS to another location. This works provided the IHS is used in standalone mode, i.e. not attached to a docking device. However, if an IHS is docked to a docking device, the operating system must first be notified that undocking is requested prior to physically undocking the portable IHS and moving the portable IHS. If the IHS is using the Windows 2000 or Windows XP operating system, the user can go to the start menu and select undock. (Windows is a trademark of Microsoft Corporation.) Alternatively, the user can press an eject request button or undocking request button usually located on the docking device to inform the operating system of the desire to undock. The user typically must wait for an "OK to undock" indication before removing the portable IHS from the docking device.

If the user closes the display of the portable IHS without first notifying the operating system of the intent to undock by one of the two methods just described, the IHS and/or the docking device may exhibit unpredictable behavior which is not desirable. Moreover, each of these two methods of notifying the operating system of an intent to undock has a disadvantage. First, locating and navigating through the start menu to notify the operating system of an intent to undock takes time as compared to pushing the eject request button on the docking device. Secondly, locating and pressing the eject request button on the docking device can be problematic. When the display is in the upright "in use" position it acts as a barrier between the user and the eject request button on the docking device. The user will often need to lower the display part way so that the eject request button can be seen. However, the user must avoid closing the display fully because that would trigger a power saving suspend mode. Once suspend mode is engaged it is too late to notify the operating system that undocking is desired. Thus, the user is presented with the awkward procedure of closing the display part way so that the eject request button on the docking device can be seen and pressed. When the operating system verifies that it is permitted to proceed with undocking, the user can finally close the display all the way and press a mechanical eject lever to actually remove the portable IHS from the docking device.

What is needed is a way to notify the operating system of the user's intent to undock the portable IHS from the docking device without navigating the start menu and without the multiple steps of partly closing the display to reveal the eject request button followed by pressing the eject request button and finally closing the display fully.

SUMMARY

Accordingly, in one embodiment, a method is disclosed for undocking an information handling system (IHS) which is docked to a docking device. The IHS includes a display which is movable between an open position and a closed position. The method includes sensing, by the IHS, when the display moves from the open position to the closed position. The method also includes initiating, by the IHS, an undocking request when it is sensed that the display has moved from the open position to the closed position.

In another embodiment, an information handling system (IHS) is disclosed which includes a processor and a memory coupled to the processor. The IHS also includes a display which is coupled to the processor, the display being movable between an open position and a closed position. The IHS further includes a docking port, coupled to the processor, for receiving a docking device. The IHS still further includes a nonvolatile storage which is coupled to the processor and which includes executable code for monitoring a display closed signal to determine when the display is moved from the open position to the closed position. The executable code initiates an undocking request when the display closed signal indicates that the display has been moved from the open position to the closed position A principal advantage of the embodiments disclosed herein is enhanced ease of use when the user of a portable IHS attempts to undock the IHS from a docking device.

BRIEF DESCRIPTION OF THE DRAWINGS

FIG. 3 is a flow chart depicting am embodiment of the undocking methodology employed in the disclosed information handling system.

DETAILED DESCRIPTION

Figure 1:
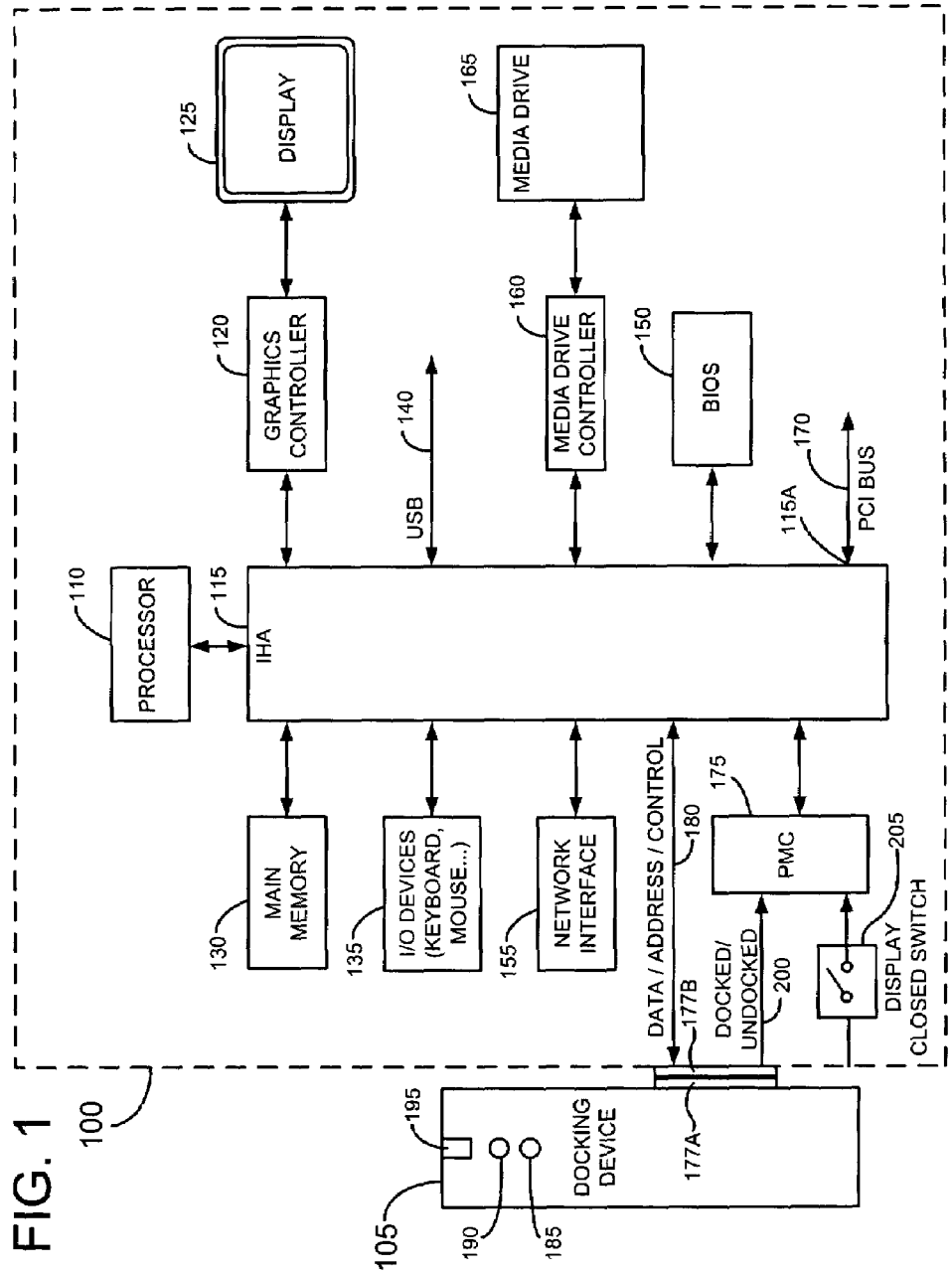
FIG. 1 is a block diagram of an embodiment of the disclosed information handling system.

FIG. 1 is a block diagram of the disclosed information handling system (IHS) 100 shown docked with a docking device 105.

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Information handling system (IHS) 100 includes a processor 110 such as an Intel Pentium series processor or one of many other processors currently available. An Intel Hub Architecture (IHA) chipset 115 provides IHS 100 with glue-logic that connects processor 110 to other components of IHS 100. Chipset 115 carries out graphics/memory controller hub functions and I/O functions. More specifically, chipset 115 acts as a host controller which communicates with a graphics controller 120 coupled thereto. Graphics controller 120 is coupled to a display 125. Chipset 115 also acts as a controller for main memory 130 which is coupled thereto. Chipset 115 further acts as an I/O controller hub (ICH) which performs I/O functions. Input devices 135 such as a mouse, keyboard, and tablet, are also coupled to chipset 115 at the option of the user. A universal serial bus (USB) 140 is coupled to chipset 115 to facilitate the connection of peripheral devices to IHS 100. System basic input-output system (BIOS) 150 is coupled to chipset 115 as shown. BIOS 150 is stored in nonvolatile memory such as CMOS or FLASH memory. A network interface controller (NIC) 155 is coupled to chipset 115 to facilitate connection of system 100 to other information handling systems. A media drive controller 160 is coupled to chipset 115 so that devices such as media drive 165 can be connected to chipset 115 and processor 110. Devices that can be coupled to media drive controller 160 include CD-ROM drives, DVD drives, hard disk drives and other fixed or removable media drives. IHS 100 includes an operating system which is stored on media drive 165. Typical operating systems which can be stored on media drive 165 include Microsoft Windows XP, Microsoft Windows 2000 and the Linux operating systems. (Microsoft and Windows are trademarks of Microsoft Corporation.) An expansion bus 170, such as a Peripheral Component Interconnect (PCI) bus, is coupled to chipset 115 as shown to enable IHS 100 to be connected to other devices which provide IHS 100 with additional functionality.

IHS 100 includes a power management controller 175 which is coupled to chipset 115. PMC 175 is a microcontroller which controls the distribution of power from a DC battery power source and an external AC power source (not shown). In addition to this power control function, the microcontroller of PMC 175 also controls the docking and undocking of docking device 105 to IHS 100. In this embodiment, docking device 105 is a port replicator which provides a pass-through of I/O ports on IHS 100. Alternatively, docking device 105 is a docking station which provides such pass-through function and also includes space for expansion cards to provide IHS 100 with additional functionality. Docking device 105 includes a multi-terminal connector 177A which mates with a corresponding multi-terminal connector 177B on IHS 100. When IHS 100 is docked with docking device 105 as shown in FIG. 1, data, address and control signals pass between docking device 105 and chipset 115 via bus 180.

Docking device 105 includes a power on/off switch 185, an undocking request switch 190 and a mechanical eject lever 195. A docked/undocked status line 200 is coupled to PMC 175 as shown. Docked/undocked status line 200 carries a docked/undocked signal which indicates to PMC 175 when IHS 100 is docked to docking device 105 and further indicates to PMC 175 when IHS 100 is undocked from docking device 105. A display closed switch 205 is coupled to PMC 175 to inform PMC 175 when display 125 is moved from an open position to a closed position. As will be seen more clearly in FIG. 2B which will be discussed later, display 125 of IHS 100 can be moved from an open/in-use position to a closed/stowed position.

Figure 2A:
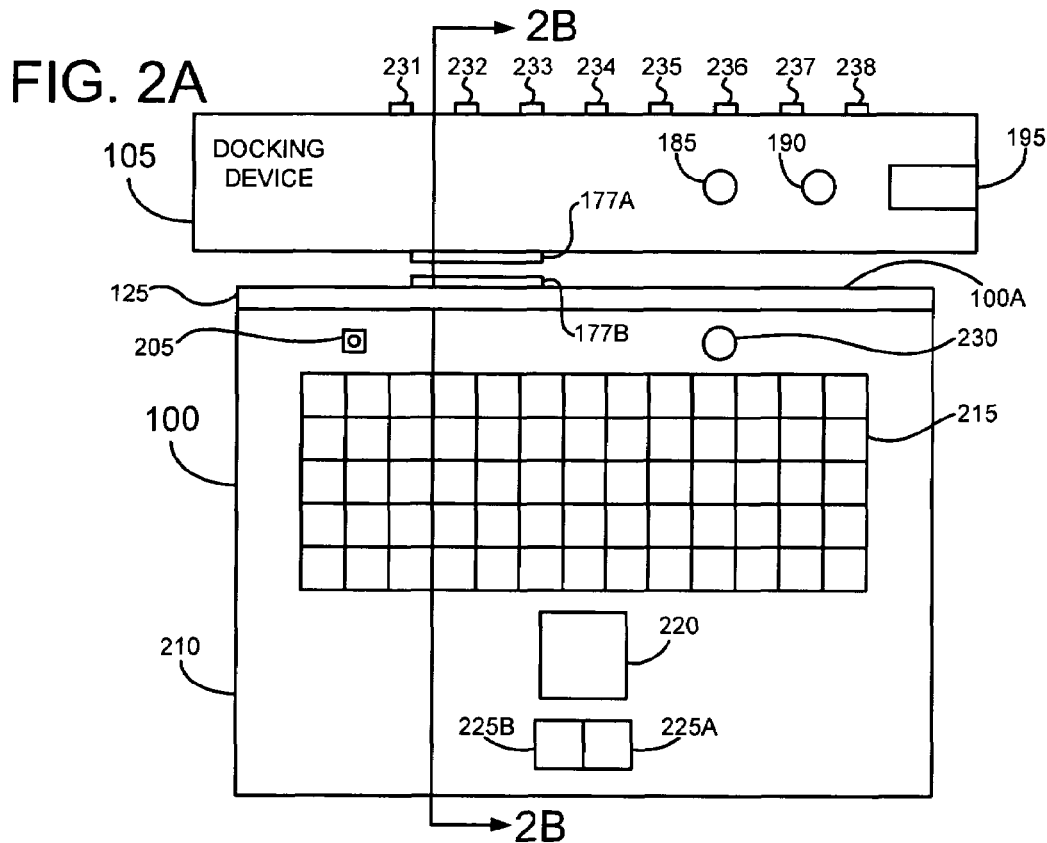
FIG. 2A is a top plan view of the information handling system of FIG. 1.

FIG. 2A is a top plan view of IHS 100 and docking device 105. IHS 100 is shown undocked from docking device 105, that is, docking connector 177B of IHS 100 is spaced apart from docking connector 177A of docking device 105. When docked, these two connectors are mated together. Portable IHS 100 includes a base unit 210 which includes a keyboard 215, a pointing device or touchpad 220, right and left pointing device switches, 225A and 225B, respectively, and a power on/off switch 230.

The view of docking device 105 in FIG. 2A shows on/off switch 185, undock request switch 190 as well as mechanical eject lever 195 which when pressed forces IHS 100 away from docking device 105 such that connector 177B separates from connector 177A. Before such physical undocking occurs, the operating system of IHS 100 must be informed of the user's intent to undock. The user can indicate this intent by pressing undock request switch 190 in the conventional manner.

Docking device 105 replicates ports (not shown) on the rear 100A of IHS 100 such as DC power-in, serial, VGA video, parallel, RJ-45, RJ-11, S Video and USB ports. The replicated ports on docking device 105 are shown as DC power-in port 231, serial port 232, VGA video port 233, parallel port 234, RJ-45 port 235, RJ-11 port 236, S Video port 237 and USB ports 238. In one embodiment, docking device 105 takes the form of a port replicator which passes signals between the ports on IHS 100 and the corresponding replicated ports on docking device 105. In another embodiment, docking device 105 takes the form of a docking station which is configured to be larger than a port replicator so that it can accommodate expansion cards and/or functional modules such as disk drives, for example, to provide IHS 100 with additional functionality as well as replicating the ports discussed above.

Figure 2B:
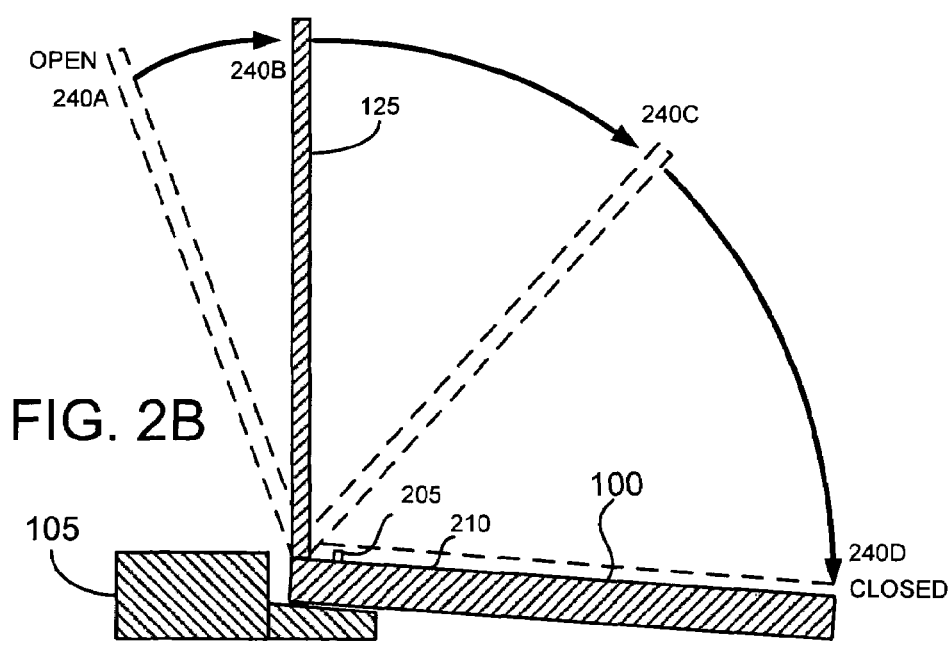
FIG. 2B is a cross sectional view of the information handling system of FIG. 2A taken along section line 2B—2B.

FIG. 2B shows a side sectional view of IHS 100 and docking device 105 of FIG. 2A taken along section line 2B—2B. As seen in FIG. 2B, IHS 100 includes a display 125 which pivots about base unit 210 from a fully open position 240A, to an upright position 240B through a partially closed position 240C to a fully closed position 240D. IHS 100 includes a display closed switch 205 which is mechanically engaged by display 125 as display 125 is pivoted or rotated to the fully closed position 240D. When switch 205 is closed by closure of display 125, the display closed signal supplied to PMC 175 of IHS 100 in FIG. 1 is changed from a logical zero to a logical 1 to inform the controller in PMC 175 that the display is now closed. Assuming that IHS 100 is currently docked to docking device 105, PMC 175 also receives a docked/undocked signal having a logical 1 value which indicates that connector 177A of docking device 105 is currently connected to connector 177B of IHS 100.

As noted earlier, prior to the physical undocking of IHS 100 from docking device 105, the operating system of IHS 100 should be informed of the user's intent to undock. This can be done by manually activating undocking request switch 190 on docking device 105. However, this is not always convenient because display 125 can get in the way reaching and feeling switch 190. IHS 100 includes an alternative methodology for notifying the operating system that undocking is desired by the user, namely lowering of display 125 to the closed position triggers display closed switch 205 which changes the state of the display closed signal provided to PMC 175. PMC 175 notifies the operating system that the user desires to undock as indicated by the now closed display 125 and the changed state of the display closed signal. This feature can be turned on or off by the user in a BIOS setup menu as discussed later.

FIG. 3 is a flowchart which shows the disclosed methodology for undocking an IHS from a docking device. The methodology is implemented in software stored in BIOS 150, the steps of which be shown in the flowchart. IHS 100 is initialized by turning on power to IHS 100 as per start block 300. A test is then conducted at decision block 305 to determine if the user is pressing a BIOS setup key (such as an F2 key) on keyboard 215. If the user is pressing a BIOS setup key, then prior to fully loading the BIOS, IHS 100 enters a BIOS setup mode in block 310. Once in BIOS setup mode, the user is given the opportunity to select an option wherein the closure of display 125 informs the operating system that undocking is desired. In other words, in block 310 the user is given the option of selecting the disclosed "display closure auto-undock request feature". If this option is selected at block 310, for example by placing a check in an appropriate check box on the display, the IHS will subsequently sense the moving of the display from an open position to a closed position and use this to trigger an undock request to the operating system. This feature is conveniently referred to as the "display closure auto-undock request feature". When the user exits the BIOS setup mode of block 310, process flow continues to block 315 where loading of BIOS continues and completes. The operating system and user applications are then loaded as per block 320.

IHS 100 now starts monitoring the display closed signal from display closed switch 205 to determine if display 125 is moved from the display open position to the display closed position as per decision block 325. In other words, decision block 325 determines if a display closed event has occurred. If a display closed event has not occurred then process flow continues back to the input of decision block 325 and the IHS continues to monitor for a display closed event. However, once decision block 325 determines that a display closed event has occurred, PMC 175 generates an interrupt. BIOS software services this interrupt and follows the steps in blocks 330–350 as indicated in flowchart of FIG. 3.

More particularly, to service this interrupt the BIOS software conducts a test to determine if IHS 100 is presently docked to docking device 105 as per block 330. This test is performed by testing the state of the docked/undocked signal associated with status line 200. If the docked/undocked signal indicates that IHS 100 is docked to docking device 105, then a test is conducted at decision block 335 to determine if the user had earlier indicated that he or she desired the closure of the display to be the trigger for the generation of an undock request to the operating system. It will be recalled that this is the "display closure auto-undock request feature" which is selectable by the user in block 310. If the user did earlier select the "display closure auto-undock request feature", then process flow continues to block 340 at which the BIOS software informs the operating system that undocking is requested. Process flow continues to block 345 at which the method is complete and the user is free to press mechanical lever 195 to physically eject IHS 100 from docking device 105.

Returning to decision block 335, if it is determined that the user did not previously select the "display closure auto-undock request feature", then process flow continues to block 350 at which the BIOS software notifies the operating system that the display has been closed. Process flow continues to block 345 at which the method is complete. Subsequently, because the display is closed, the operating system may place IHS 100 in a reduced power suspend state to conserve energy.

Advantageously, the disclosed methodology and apparatus provide a convenient way for the IHS user to trigger an undocking request by closing the display of the IHS without the need for locating and pressing an undock request button on the docking device. The necessity of moving the display to unblock access to the docking device's undock request button is avoided. Because the display need not be moved to unblock access to the undock request button on the docking device, there is less likelihood that suspend mode is accidentally triggered prior to an undock request.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of undocking an information handling system (IHS) which is docked to a docking device, the IHS including a display which is movable between an open position and a closed position, the method comprising:
   initiating a BIOS setup mode;
   sensing, by the IHS, when the display moves from the open position to the closed position;
   selecting an option, in response to initiating the BIOS setup mode, wherein closing of the display informs the IHS operating system that undocking is desired;

initiating, by the IHS, in response to the option being selected, an undocking request when it is sensed that the display has moved from the open position to the closed position; and in response to the option not being selected, notifying the IHS operating system that the display has been closed.

2. The method of claim 1 wherein the IHS includes an operating system, the method further including communicating the undocking request to the operating system.

3. The method of claim 1 wherein the docking device includes an eject lever, the method further comprising activating the eject lever to eject the IHS from the docking device subsequent to the initiating of the undock request.

4. The method of claim 1 wherein the docking device is a port replicator.

5. The method of claim 1 wherein the docking device is a docking station.

6. The method of claim 1 wherein the IHS includes BIOS software which monitors the display to determine when the display is moved from an open position to a closed position.

7. The method of claim 2 including generating an interrupt when the display moves from the open position to the closed position.

8. The method of claim 7 wherein the IHS includes BIOS software, the BIOS software servicing the interrupt by notifying the operating system that undocking is requested.

9. The method of claim 8 including determining if the IHS is docked to the docking device prior to notifying the operating system that undocking is requested.

10. The method of claim 9 including notifying the operating system that the display is closed without requesting undocking if the IHS is not docked to the docking device.

11. An information handling system (IHS) comprising:
a processor;
a memory coupled to the processor;
a display, coupled to the processor, and movable between an open position and a closed position;
a docking port, coupled to the processor; for receiving a docking device;
nonvolatile storage, coupled to the processor, and including executable code for monitoring a display closed signal to determine when the display is moved from the open position to the closed position and for initiating, in response to an option being selected, an undocking request when the display closed signal indicates that the display has been moved from an open position to a closed position;
means for initiating a BIOS setup mode;
means for selecting the option, in response to initiating the BIOS setup mode, wherein closing of the display informs the IHS operating system that undocking is desired; and in response to the option not being selected, means for notifying the IHS operating system that the display has been closed.

12. The IHS of claim 11 wherein the executable code tests to determine if the IHS is coupled to the docking device.

13. The IHS of claim 12 including an operating system which is supplied the undocking request when the display closed signal indicates that the display is moved from the open position to the closed position, provided the IHS is docked to a docking device.

14. The IHS of claim 12 wherein the docking device is a docking station.

15. The IHS of claim 12 wherein the docking device is a port replicator.

16. The IHS of claim 12 including a base unit in which the processor, memory, docking port and nonvolatile storage are housed.

17. The IHS of claim 16 wherein the display pivots about the base unit from the open position to the closed position.

18. The IHS of claim 16 wherein the base unit includes a display closed switch which controls the display closed signal that indicates when the display moves from the open position to the closed position.

19. The IHS of claim 16 wherein the base unit includes a lever which ejects the IHS from the docking device when actuated by a user.

20. The IHS of claim 11 including a controller for monitoring the display closed signal.

21. Apparatus for undocking an information handling system (IHS) comprising:
a docking device;
an IHS docked to the docking device;
a display included in the IHS being movable between an open position and a closed position; and
the IHS including:
means for sensing when the display moves from the open position to the closed position;
means for initiating, in response to an option being selected, an undocking request in response to a sensing that the display has moved from the open position to the closed position including:
means for initiating a BIOS setup mode; and
means for selecting the option, in response to initiating the
BIOS setup mode, wherein closing of the display informs the IHS operating system that undocking is desired; and
in response to the option not being selected, means for notifying the IHS operating system that the display has been closed.

* * * * *